(12) United States Patent
Gu et al.

(10) Patent No.: US 10,807,193 B2
(45) Date of Patent: Oct. 20, 2020

(54) METHOD OF LASER BEAM LOCALIZED-COATING

(71) Applicant: Magna International Inc., Aurora (CA)

(72) Inventors: Hongping Gu, Newmarket (CA); Aldo Anthony Van Gelder, Newmarket (CA)

(73) Assignee: Magna International Inc., Aurora (CA)

( * ) Notice: Subject to any disclaimer, the term of this patent is extended or adjusted under 35 U.S.C. 154(b) by 594 days.

(21) Appl. No.: 15/100,257

(22) PCT Filed: Nov. 24, 2015

(86) PCT No.: PCT/CA2015/051221
§ 371 (c)(1),
(2) Date: May 27, 2016

(87) PCT Pub. No.: WO2016/101064
PCT Pub. Date: Jun. 30, 2016

(65) Prior Publication Data
US 2017/0001260 A1 Jan. 5, 2017

Related U.S. Application Data

(60) Provisional application No. 62/096,316, filed on Dec. 23, 2014.

(51) Int. Cl.
*B23K 26/32* (2014.01)
*B23K 26/34* (2014.01)
(Continued)

(52) U.S. Cl.
CPC .......... *B23K 26/322* (2013.01); *B23K 26/144* (2015.10); *B23K 26/34* (2013.01);
(Continued)

(58) Field of Classification Search
CPC .. B23K 26/322; B23K 26/26; B23K 2103/04;
B23K 26/144; B23K 26/34;
(Continued)

(56) References Cited

U.S. PATENT DOCUMENTS

| 4,326,118 A * | 4/1982 | Smith | B23K 26/28 |
| | | | 219/121.63 |
| 5,624,585 A * | 4/1997 | Haruta | B23K 26/26 |
| | | | 219/121.63 |

(Continued)

FOREIGN PATENT DOCUMENTS

| CN | 101622084 | 1/2010 |
| EP | 1520654 A1 | 4/2005 |

(Continued)

OTHER PUBLICATIONS

Machine translation of Japan Patent document No. 2007-253,181A, Nov. 2019.*

(Continued)

*Primary Examiner* — Geoffrey S Evans
(74) *Attorney, Agent, or Firm* — Fish IP Law, LLP

(57) ABSTRACT

A process is disclosed for laser welding sheet metal plates having an anti-corrosion surface layer pre-coat. The plates are arranged one relative to the other in an edge-butting relationship. Using a laser beam having a first beam spot-size, a laser weld joint is formed along the adjacent edges of the sheet metal plates. Subsequent to forming the laser weld joint, a localized anti-corrosion surface layer is formed at least on the laser weld joint. In particular, a laser beam having a second beam spot-size larger than the first beam spot-size is scanned along the laser weld joint. During the scanning, a flow of a powdered anti-corrosion surface layer material is directed toward a portion of the laser weld joint that is being irradiated by the laser beam. The powdered (Continued)

material is melted by the laser beam and forms a layer adhering to the laser weld joint.

31 Claims, 3 Drawing Sheets

(51) Int. Cl.
| | |
|---|---|
| *B23K 26/322* | (2014.01) |
| *B23K 26/144* | (2014.01) |
| *C23C 24/08* | (2006.01) |
| *B23K 26/342* | (2014.01) |
| *F16B 5/08* | (2006.01) |
| *B23K 101/00* | (2006.01) |
| *B23K 103/04* | (2006.01) |
| *B23K 103/20* | (2006.01) |
| *B23K 103/08* | (2006.01) |

(52) U.S. Cl.
CPC .......... *B23K 26/342* (2015.10); *C23C 24/087* (2013.01); *F16B 5/08* (2013.01); *B23K 2101/006* (2018.08); *B23K 2103/04* (2018.08); *B23K 2103/08* (2018.08); *B23K 2103/20* (2018.08)

(58) Field of Classification Search
CPC .............. B23K 26/342; B23K 2101/18; B23K 2103/20; B23K 2104/04; B23K 2103/166
See application file for complete search history.

(56) References Cited

U.S. PATENT DOCUMENTS

| | | | |
|---|---|---|---|
| 9,050,681 B2 | 6/2015 | Hamatani | |
| 2003/0138203 A1* | 7/2003 | Imakado | B23K 26/073 385/33 |
| 2006/0278618 A1* | 12/2006 | Forrest | B23K 26/0604 219/121.64 |
| 2009/0266801 A1* | 10/2009 | Oku | B23K 26/32 219/121.64 |
| 2010/0143746 A1* | 6/2010 | Song | C23C 24/04 428/636 |
| 2012/0325379 A1 | 12/2012 | Baulig et al. | |
| 2013/0043219 A1* | 2/2013 | Peters | B23K 35/0261 219/72 |
| 2014/0003860 A1* | 1/2014 | Evangelista | B23K 9/235 403/270 |
| 2016/0158873 A1* | 6/2016 | Amedick | B23K 11/004 219/86.1 |

FOREIGN PATENT DOCUMENTS

| | | |
|---|---|---|
| JP | 2007253181 A * | 10/2007 |
| WO | 2014-131491 A1 | 9/2014 |

OTHER PUBLICATIONS

ISA/CA, International Search Report and Written Opinion, Int'l Appln No. PCT/CA2015/051221, dated Feb. 9, 2016 (9 pages).
CN Office Action; 201610439393.5; Mai Gena International Corporation.

* cited by examiner

METHOD OF LASER BEAM LOCALIZED-COATING

FIELD OF THE INVENTION

The present invention relates generally to laser welding in the manufacture of sheet metal components, such as for example automobile components. More particularly, the present invention relates to a process and a system for forming a localized anti-corrosion surface layer along a laser welded joint (weld bead), subsequent to the laser welding together of sheet metal plates having an anti-corrosion surface layer pre-coat.

BACKGROUND OF THE INVENTION

Automobiles are mass-produced along assembly lines, in which the various systems and components that make up an automobile are joined together using human and/or robot controlled tools. Oftentimes, different sheet metal pieces are joined together in order to form a desired component. For instance, "tailor-welded blanks" are formed by joining together, such as for instance by laser welding, two or more steel blanks of different compositions and/or different thicknesses. After the welded-blanks have been cold-pressed, components are obtained having properties of mechanical strength, pressability and impact absorption that vary within the components themselves.

In order to provide improved corrosion resistance, it is common to fabricate such blanks using coated sheet-metal materials, such as for instance boron steels with an aluminum-silicon or a zinc pre-coating surface layer. Unfortunately, the process of laser welding together the pre-coated sheet metal plates results in the formation of a weld joint that is devoid of anti-corrosion protection. Over time, exposure to water, road salt, etc. leads to corrosion along the weld joint and concomitant loss of weld integrity. Loss of weld integrity can lead to separation of the sheet metal plates along the weld joint, resulting in failure of the entire component.

In addition, for hot-stamped components that are fabricated from boron steel, such as Usibor material, the disruption of the AlSi layer along the weld joint causes scaling along the weld joint during subsequent hot-stamping processing.

The prior art solution to this problem involves applying a primer layer to cover the weld joint, and then painting the component to provide a physical barrier from the ambient environment. Unfortunately, the corrosion protection that is provided by the paint layer is inferior to the original coating since the bonding of the paint layer to the base metal is weak. In addition, the paint layer may become damaged over time, allowing water, road salt etc. to come into contact with the underlying weld joint. This may happen, for instance, if the paint is scratched or chipped, or if the paint is not applied properly in the first place and therefore fails to adhere to the underlying material. Further, only the exterior surfaces of many components are painted, and as a result corrosion may occur along the inward-facing surface of the weld joint.

It would therefore be beneficial to provide a process and system that overcome at least some of the above-mentioned limitations and disadvantages of the prior art.

SUMMARY OF THE INVENTION

According to an aspect of at least one embodiment of the instant invention, a process is disclosed for laser welding together sheet metal plates, the sheet metal plates each having an anti-corrosion surface layer pre-coat, the process including: arranging the sheet metal plates one relative to the other and such that an edge of one of the plates is adjacent to and in contact with an edge of another one of the plates; using a laser beam having a first beam spot-size, forming a laser weld joint along the adjacent edges of the sheet metal plates; and subsequent to forming the laser weld joint, forming a localized anti-corrosion surface layer at least on the laser weld joint, including: scanning a laser beam having a second beam spot-size along the laser weld joint, the second beam spot-size larger than the first beam spot-size; and during the scanning, providing a flow of a powdered anti-corrosion surface layer material toward a portion of the laser weld joint that is being irradiated by the laser beam, wherein the powdered anti-corrosion surface layer material is melted by the laser beam and forms a layer adhering to the laser weld joint.

According to an aspect of at least one embodiment of the instant invention, a process is disclosed for joining together metallic parts, including: joining together a first metallic part and a second metallic part at a joining region, at least one of the first metallic part and the second metallic part having an anti-corrosion surface layer pre-coat, and wherein the surface layer pre-coat is disrupted within the joining region during the joining; and forming a localized anti-corrosion surface layer within a target area that is at least one of within the joining region and adjacent to the joining region, including: scanning a laser beam having a predetermined beam spot-size through the target area; and during the scanning, providing a flow of a powdered anti-corrosion surface layer material toward a portion of the target area that is being irradiated by the laser beam, wherein the powdered anti-corrosion surface layer material is melted by the laser beam and forms a layer adhering to surfaces within the joining region.

According to an aspect of at least one embodiment of the instant invention, a multi-part side panel for an automobile is disclosed, having: two sheet metal plates, each having an anti-corrosion surface layer pre-coat, and being joined together along a laser weld joint; and a localized anti-corrosion surface layer formed at least on the laser weld joint, whereby the localized anti-corrosion surface layer forms a barrier between the laser weld joint and the ambient atmosphere.

According to an aspect of at least one embodiment of the instant invention, a door ring for an automobile is disclosed, having: two sheet metal plates, each having an anti-corrosion surface layer pre-coat, and being joined together along a laser weld joint; and a localized anti-corrosion surface layer formed at least along the laser weld joint, whereby the localized anti-corrosion surface layer forms a barrier between the laser weld joint and the ambient atmosphere.

According to an aspect of at least one embodiment of the instant invention, a multi-piece part for an automobile is disclosed, having two sheet metal plates, each having an anti-corrosion surface layer pre-coat, and being joined together along a laser weld joint; and a localized anti-corrosion surface layer formed at least on the laser weld joint, whereby the localized anti-corrosion surface layer forms a barrier between the laser weld joint and the ambient atmosphere. For example, the multi-piece part is a multi-piece body side for an automobile or a multi-part side panel for an automobile.

According to an aspect of at least one embodiment of the instant invention, a system is disclosed for laser-welding together pre-coated sheet metal plates, comprising: a support for holding a first pre-coated sheet metal plate in a predetermined orientation relative to a second pre-coated sheet metal plate, such that an edge of the first plate and an edge of the second plate are disposed adjacent to one another and define an interface therebetween; a laser optic assembly in optical communication with a laser source and operable in a first mode for scanning a laser beam having a first beam spot-size along the interface and in a second mode for scanning a laser beam having a second beam spot-size larger than the first beam spot-size along the interface; a powder delivery conduit in communication with a source of a powdered anti-corrosion surface layer material and having an outlet end disposed for directing a flow of the powdered anti-corrosion surface layer material toward the interface; and at least one actuator for relatively moving the laser optic assembly and the outlet end of the powder delivery conduit relative to the support, wherein the laser beam having the first beam spot-size is scanned along the interface in a first pass to form a laser weld joint between the first and second plates, and wherein the laser beam having the second beam spot-size is scanned along the laser weld joint, and at the same time the powdered anti-corrosion surface layer material is fed via the powder delivery conduit toward a currently irradiated portion of the laser weld joint, to form a localized anti-corrosion surface layer at least on the laser weld joint.

BRIEF DESCRIPTION OF THE DRAWINGS

The invention will now be described by way of example only, and with reference to the attached drawings, wherein similar reference numerals denote similar elements throughout the several views. It should be understood that the drawings are not necessarily to scale. In certain instances, details that are not necessary for an understanding of the disclosure or that render other details difficult to perceive have been omitted.

DETAILED DESCRIPTION OF THE INVENTION

The following description is presented to enable a person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the scope of the invention. Thus, the present invention is not intended to be limited to the embodiments disclosed, but is to be accorded the widest scope consistent with the principles and features disclosed herein.

Figure 1A:
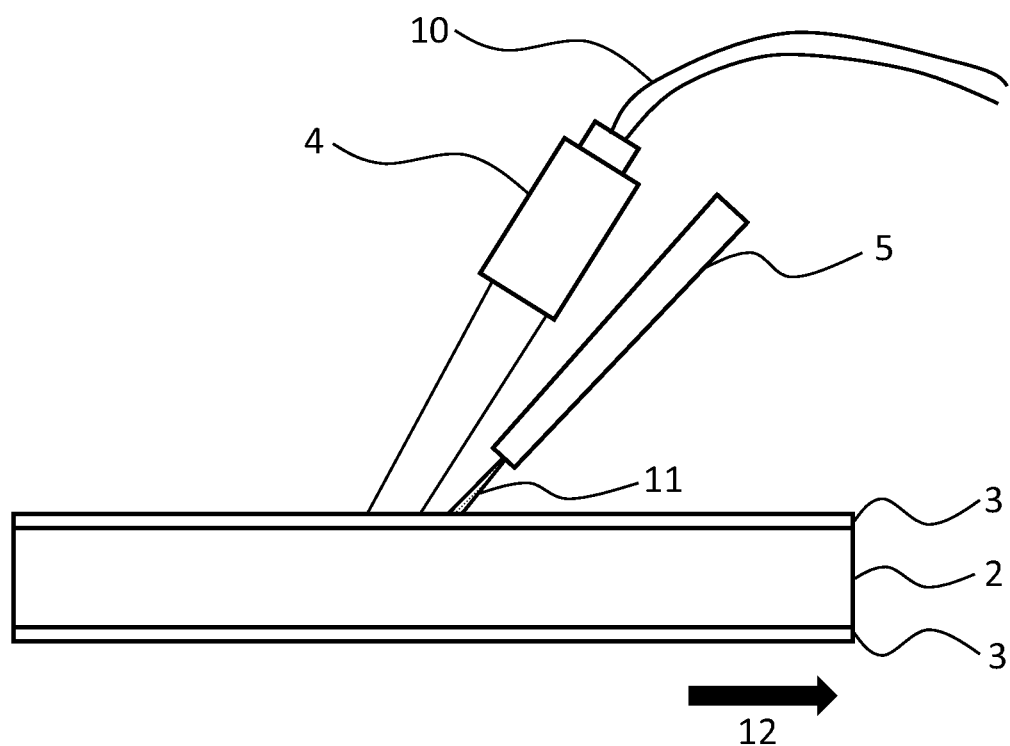
FIG. 1A-1B are simplified perspective diagrams showing a system according to an embodiment of the invention, subsequent to laser welding two pre-coated sheet metal plates together, and during formation of a localized anti-corrosion surface layer along the laser weld joint.
Figure 1B:
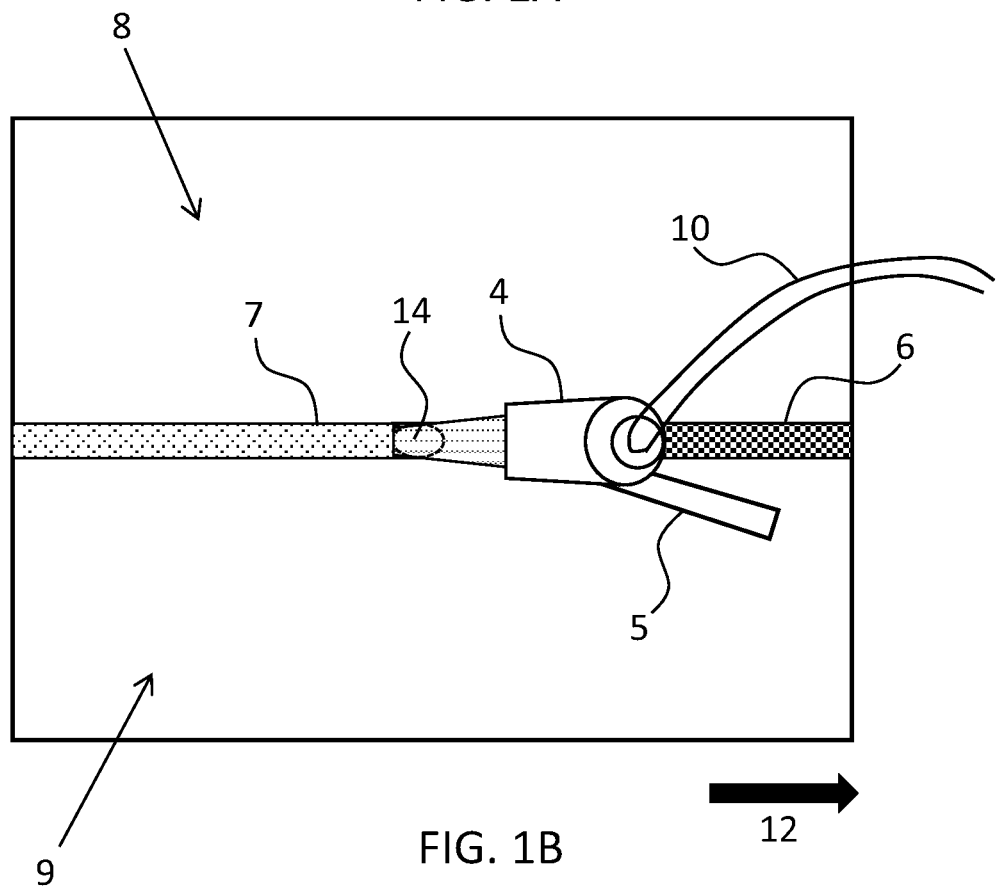

Referring now to FIG. 1A-1B, shown are simplified perspective diagrams of a system 100 in accordance with an embodiment of the invention. More particularly, system 100 is shown at a time that is subsequent to laser welding together two pre-coated sheet metal plates 8 and 9, and that is during the forming of a localized anti-corrosion surface layer 7 along laser weld joint 6. Plate 8 includes a substrate 1, which has a pre-coat layer 3 disposed on both sides thereof. Similarly, plate 9 includes a substrate 2, which has a pre-coat layer 3 disposed on both side thereof. In the example that is shown in FIG. 1 the substrate 2 is relatively thicker than the substrate 1, but optionally the substrates have the same thickness. By way of a specific and non-limiting example the substrates 1 and 2 are fabricated from boron steels, and may be dissimilar e.g. having different mechanical properties and/or different alloy compositions. The pre-coat layers 3 are formed in a known manner, such as for instance by dip-coating the substrates 1 and 2 in a bath of molten zinc or molten aluminum alloy. It is to be understood that, for simplicity, the pre-coat layers 3 are depicted in FIG. 1A and FIG. 1B as a single layer. However, in practice the pre-coat layers 3 comprise an intermetallic alloy layer that is in contact with the steel substrate 1 or 2, and a metallic alloy layer that is in contact with the intermetallic alloy layer. Typically, the material of the pre-coat layers 3 has a melting temperature that is much lower than the melting temperature of the underlying steel substrate 8 or 9. For instance, an aluminum-silicon (AlSi) alloy coating has a melting temperature lower than 600° C., compared to about 1500° C. for the steel substrate.

The system 100 includes a laser optic assembly 4, which receives laser light from a laser source via a fiber (referred to collectively as laser source 10). The laser optic assembly 4 is operable in a first mode for scanning a laser beam having a first beam spot-size along the interface between adjacent edges of plates 8 and 9, and also in a second mode for scanning a laser beam having a second beam spot-size along the resulting weld joint that is formed at the interface, the second beam spot-size being larger than the first beam spot-size. By way of an example, the laser optic assembly 4 includes at least a lens, and the fiber of the laser source 10 is either a single core fiber or a multiple core fiber bundle.

The system 100 also includes a conduit 5 that is in communication with a not illustrated source of powdered anti-corrosion surface layer material, and having an outlet end that is disposed for directing a flow 11 of powdered anti-corrosion surface layer material toward the laser weld joint 6. Optionally, conduit 5 includes a not illustrated nozzle at an outlet end thereof for controlling delivery of the powdered anti-corrosion surface layer material. A not-illustrated support is provided for maintaining the plate 8 relative to the plate 9 for being welded together along adjacent edges thereof. The system 100 further includes at least one not-illustrated actuator for relatively moving the laser optic assembly 4 relative to the support. Optionally, the at least one actuator supports translational movement of the support and/or the laser optic assembly 4 and/or the conduit 5. Alternatively, the at least one actuator supports rotational movement of at least a portion of the laser optic assembly 4, such as for instance a not-illustrated mirror element.

A process according to an embodiment of the invention is performed in two steps, including a laser welding step for joining together the plates 8 and 9 and a protective layer forming step for forming an anti-corrosion layer on at least the weld joint between the plates 8 and 9. The laser-welding step includes using the laser optic assembly 4 to generate a laser beam having a first beam spot-size. The first beam spot-size is selected such that the laser beam causes heating along the adjacent edges of the plates 8 and 9 that is sufficient to melt the material of the substrates 1 and 2, thereby forming a weld pool. As the laser beam is scanned along interface between the plates 8 and 9, a continuous weld joint 6 is formed. As is apparent to one of skill in the art, the weld joint 6 is devoid of a protective anti-corrosion layer. Further, the laser-welding step disrupts the pre-coat layer 3 adjacent to the laser weld joint 6, thereby exposing the underlying substrate 1, 2. The laser weld joint 6 and the regions of exposed substrate 1, 2 are susceptible to corrosion under the normal operating conditions of an automobile, and may be the site of component failure at some time in the future.

The protective-layer forming step is performed subsequently, in order to improve corrosion resistance along the laser weld joint 6 and within the regions of exposed substrate 1, 2. The protective-layer forming step includes using the laser optic assembly 4 to generate a laser beam having a second beam spot-size, wherein the second beam spot-size is larger than the first beam spot-size. As the laser beam is scanned in the direction indicated by arrow 12, a flow 11 of the powdered anti-corrosion surface layer material is directed toward the laser weld joint 6, at a location that is currently being irradiated by the laser beam. The second beam spot-size is selected such that the laser beam causes heating that is sufficient to melt the powdered anti-corrosion surface layer material, but not the material of the substrates 1 and 2 or the material of the weld joint 6. For example, when the powdered anti-corrosion surface layer material is powdered zinc the heating achieves a temperature of about 400° C., and when the powdered anti-corrosion surface layer material is powdered AlSi the heating achieves a temperature of about 600° C. After the laser beam passes, the deposited molten anti-corrosion surface layer material consolidates and solidifies, forming the anti-corrosion surface layer 7.

Various ways of scanning the laser beam and delivering the flow of the powdered anti-corrosion surface layer material may be envisioned, including tilting the laser beam to produce an elongate beam spot 14 for optimizing the melting of the powdered anti-corrosion surface layer material, as shown more clearly in FIGS. 1A and 1B. In one set-up, the laser optic assembly 4 and the conduit 5 are stationary, and the plates 8 and 9 move with the support in a direction that is opposite the direction indicated by the black arrow 12. In an alternative set-up, the support is stationary and the laser optic assembly 4 and the conduit 5 are moved in the direction indicated by the black arrow 12. Optionally, the laser optic assembly 4 does not undergo translational movement, but rather a mirror or other beam-directing element is used to scan a laser beam spot in the direction that is indicated by the black arrow 12, and the outlet end of the conduit 5 follows the position of the beam spot. Alternatively, the support is used to move the plates 8 and 9 in a direction that is opposite the direction indicated by arrow 12, whilst the laser optic assembly 4 and the conduit are moved in the direction indicated by the arrow 12.

It is to be understood that the process described above provides an anti-corrosion surface layer along one side of the weld joint 6. Since the laser welding process results in the formation of a weld bead on both sides of the plates 8 and 9, it is desirable to also provide an anti-corrosion surface layer along the opposite side of the weld joint 6. As such, the protective-layer forming step should be repeated to provide the anti-corrosion surface layer along the opposite side of the weld joint 6. Either the laser optic assembly 4 and conduit 5 are repositioned along the opposite side of the weld joint 6, or the welded-together plates 8 and 9 are "flipped over" such that the opposite side of the weld joint 6 faces toward the laser optic assembly 4 and the conduit 5.

The two-step process that is described above may be carried out at a single workstation, and the same laser optics assembly 4 and laser source 10 may be controlled to perform both the laser welding step and the protective-layer forming step. Advantageously, both steps may be performed at the same workstation, resulting in decreased labor costs and better utilization of floor space. The welds that are produced using the two-step process described above have improved corrosion resistance, and it is possible to alter or tailor the mechanical properties of the laser welds to better match the materials that are being joined. Of course, the use of powdered anti-corrosion surface layer materials requires adequate safety equipment and additional cleanup due to unused powder that may be deposited on the work pieces and in the immediate working environment.

The two-step process described above may be performed in combination with other laser welding methods, which have been described previously. For instance, when AlSi coated plates are used the laser welding step may be performed with the addition of an alloying element (e.g., titanium or nickel) in order to form a compound in the melt pool with at least some of the aluminum that enters the melt pool from the AlSi layer. The addition of alloying elements is described in U.S. Provisional Patent Application 62/051,573, which was filed on Sep. 17, 2014 and is entitled "Methods of Laser Welding Coated Steel Sheets with Addition of Alloying Elements," the entire contents of which are incorporated herein by reference. Optionally or alternatively, prior to performing the laser welding step, the pre-coat layer 3 may be removed from the target weld area between the plates 8 and 9 according to the process that is described in U.S. Provisional Patent Application 62/047,915, which was filed on Jun. 19, 2014 and is entitled "Process and System for Forming Butt-Welded Blanks," the entire contents of which are incorporated herein by reference.

Figure 2A:
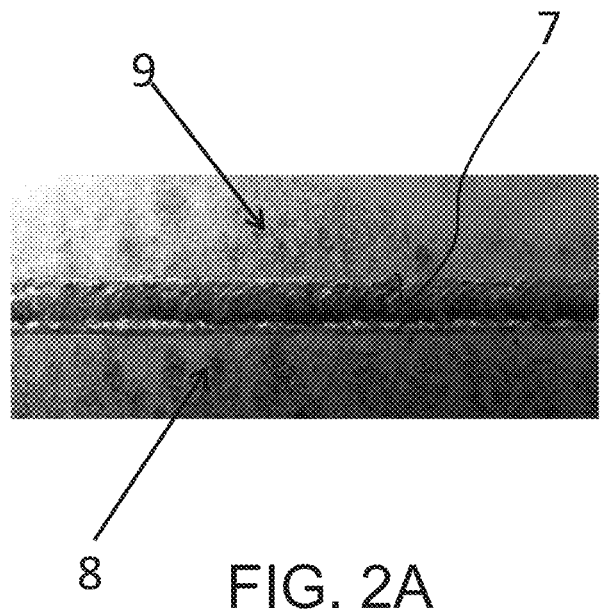
FIG. 2A shows a localized anti-corrosion surface layer formed on a first side of a laser weld joint.
Figure 2B:
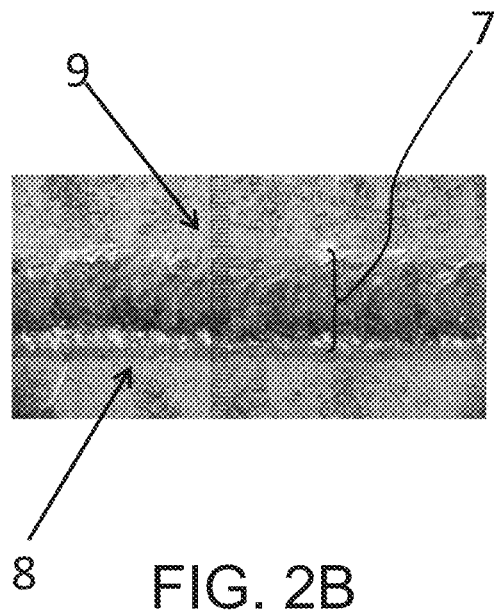
FIG. 2B is an enlarged view of a portion of FIG. 2A.

FIG. 2A shows a localized anti-corrosion surface layer formed on a first side of a laser weld joint, and FIG. 2B shows an enlarged view of a portion of FIG. 2A. Since the second laser beam-spot size is larger than the first laser beam spot-size, the powdered anti-corrosion surface layer material forms an anti-corrosion surface layer 7 on the weld joint (not shown in FIGS. 2A and 2B), and overlapping with the pre-coat layers 3 on the plates 8 and 9. As such, the an anti-corrosion surface layer 7 provides anti-corrosion protection not only along the weld joint, but also within regions adjacent to the weld joint in which the pre-coat material 3 has been disrupted. Since the anti-corrosion surface layer 7 is formed subsequent to laser welding, the layer 7 covers regions adjacent to the weld joint in which the pre-coat material has been disrupted either as a direct result of the laser welding step, or as a result of a pre-laser welding preparation step that is performed prior to laser welding, such as described in U.S. Provisional Patent Application 62/047,915 discussed supra.

Figure 3A:
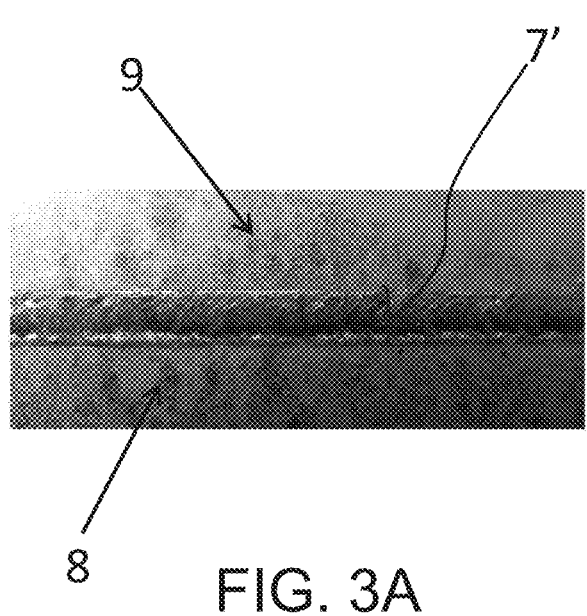
FIG. 3A shows a localized anti-corrosion surface layer formed on a second side of the laser weld joint, which is opposite the first side shown in FIG. 2A.
Figure 3B:
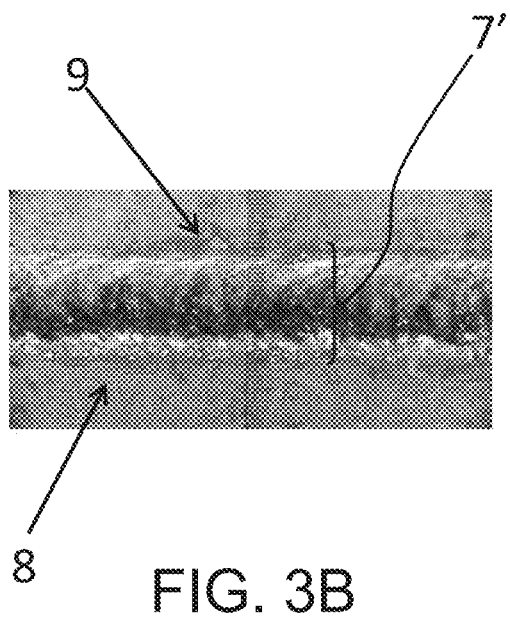
FIG. 3B is an enlarged view of a portion of FIG. 3A.

FIG. 3A shows a localized anti-corrosion surface layer formed on a second side of a laser weld joint that is opposite the first side shown in FIG. 2A, and FIG. 3B shows an enlarged view of a portion of FIG. 3A. The anti-corrosion surface layer 7' shown in FIGS. 3A and 3B is substantially identical to the anti-corrosion surface layer 7 shown in FIGS. 2A and 2B.

Figure 4:
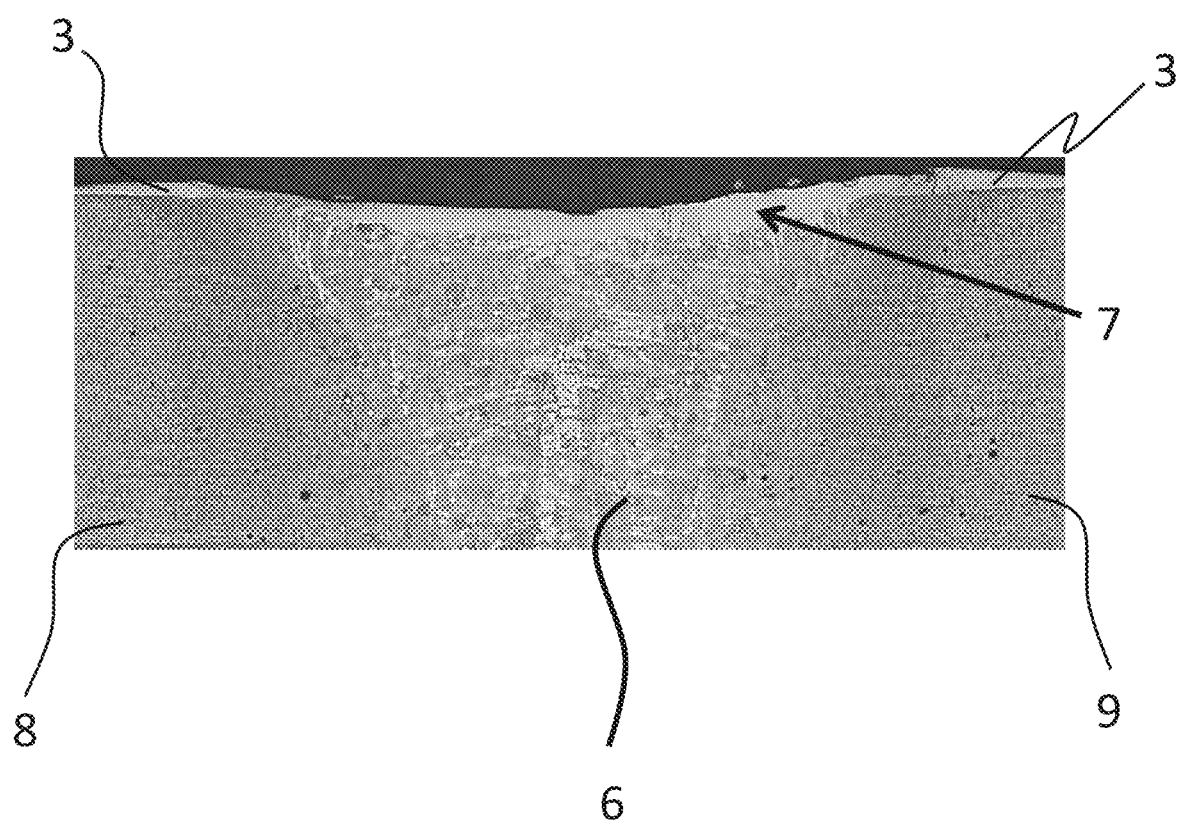
FIG. 4 is a cross-sectional view taken along the line A-A in FIG. 1, and showing a localized anti-corrosion surface layer on a laser weld joint.

FIG. 4 is a cross-sectional view taken along the line A-A in FIG. 1, and showing a localized anti-corrosion surface layer 7 on a laser weld joint 6. As shown in FIG. 4, the thickness of the layer 7 is greater than the thickness of the original pre-coat layer 3 on each of the plates 8 and 9. For instance, the thickness of the layer 7 is up to about 0.1 mm, whilst the thickness of the original pre-coat layer 3 is about 20 µm. The thickness of the layer 7 may be controllably varied, e.g., to meet the specific requirements for different applications. By way of a few specific and non-limiting examples, the thickness of the layer 7 may be varied by varying one or both of the rate of powder deposition (i.e., the flow rate at which the powdered anti-corrosion surface layer material is provided via the conduit 5) and the particle size of the powdered anti-corrosion surface layer material. The localized anti-corrosion surface layer 7 may be modified after it is initially formed. For instance, subsequent heating of the welded together plates 8 and 9, either as part of a separate forming operation or as an extension of the above-described protective layer forming step, to a temperature that is above the melting temperature of the anti-corrosion surface layer material but below the melting temperature of the substrates 1 and 2, results in melting and redistribution of the anti-corrosion surface layer material. In this way, the thickness of the layer 7 may be made more uniform. Additionally, the melted anti-corrosion surface layer material may flow into unprotected regions and thereby form a more complete anti-corrosion layer.

Of course, the process that is described in accordance with the various embodiments of the invention may be modified for use with joining techniques other than laser welding. In particular, riveting is a mechanical fastening process for joining together sheet metal plates, which results in damage occurring to protective layers on the sheet metal plates. The process that is described above may be adapted to join the sheet metal plates together by riveting in a first step, followed by performance of the protective-layer forming step. In this alternate embodiment, the laser optic assembly 4 is used only during the protective layer forming step. For instance, the laser optic assembly 4 scans a laser beam over a target area that is to be protected with an anti-corrosion surface layer, whilst a flow of the anti-corrosion surface layer material is provided via the conduit 5. The spot-size of the laser beam is selected to melt the anti-corrosion surface layer material but not the material of the rivet or the substrates 1 and 2.

Similarly, the process that is described above may be adapted for the casting of one piece around another piece with an anti-corrosion surface layer. The casting process may damage the anti-corrosion layer on the other piece, making the component susceptible to corrosion. As such, the protective layer forming step as described above may be performed subsequent to casting. Once again, the laser optic assembly 4 is used only during the protective layer forming step. For instance, the laser optic assembly 4 scans a laser beam over a target area that is to be protected with an anti-corrosion surface layer, whilst a flow of the anti-corrosion surface layer material is provided via the conduit 5. The spot-size of the laser beam is selected to melt the anti-corrosion surface layer material but not the material of the cast piece or the substrate of the other piece.

It is also to be understood that in FIG. 1 the plates 8 and 9 are shown in an arrangement for forming a butt weld joint. Optionally, the plates 8 and 9 are arranged one relative to the other to form a different type of weld joint, such as for instance a lap weld joint.

While the above description constitutes a plurality of embodiments of the present invention, it will be appreciated that the present invention is susceptible to further modification and change without departing from the fair meaning of the accompanying claims.

What is claimed is:

1. A process for laser welding together sheet metal plates, the sheet metal plates each having an anti-corrosion surface layer pre-coat, the process comprising:
   arranging the sheet metal plates one relative to the other and such that an edge of one of the plates is adjacent to and in contact with an edge of another one of the plates;
   using a first laser beam having a first beam spot-size, forming a laser weld joint along the adjacent edges of the sheet metal plates; and
   subsequent to forming the laser weld joint, forming a localized anti-corrosion surface layer at least on the laser weld joint, comprising:
      scanning a second laser beam having a second beam spot-size in a scanning direction along the laser weld joint, wherein the second beam spot-size larger than the first beam spot-size;
      tilting the second laser beam in a tilt direction to produce an elongated beam spot;
      during the scanning, providing a flow of a powdered anti-corrosion surface layer material toward a portion of the laser weld joint that is being irradiated by the laser beam,
   wherein the powdered anti-corrosion surface layer material is melted by the laser beam and forms a layer adhering to the laser weld joint; and
   wherein the tilt direction is parallel to the scanning direction.

2. The process according to claim 1, wherein the anti-corrosion surface layer material is zinc or an aluminum-silicon alloy (AlSi).

3. The process according to claim 1, wherein the sheet metal plates comprise a steel substrate, and wherein the second beam spot-size is selected to heat the powdered anti-corrosion surface layer material to a temperature that is below the melting temperature of the steel substrate and above 400° C.

4. The process according to claim 1, wherein the localized anti-corrosion layer extends beyond the edges of the laser weld joint and overlaps with the anti-corrosion surface layer pre-coat on each of the sheet metal plates.

5. The process according to claim 1, wherein the laser weld joint extends between a first side of the sheet metal plates and a second side of the sheet metal plates that is opposite the first side, and wherein the localized anti-corrosion surface layer is formed at least on the laser weld joint along each of the first side and the second side.

6. The process according to claim 1, comprising:
   selecting a flow rate of the powdered anti-corrosion surface layer material for forming a localized anti-corrosion surface layer having a predetermined thickness; and
   during the scanning, providing the powdered anti-corrosion surface layer material at the selected flow rate.

7. The process according to claim 1, comprising:
   selecting a particle size of the powdered anti-corrosion surface layer material for forming a localized anti-corrosion surface layer having a predetermined thickness; and
   during the scanning, providing the powdered anti-corrosion surface layer material having the selected particle size.

8. The process according to claim 1, wherein the localized anti-corrosion surface layer has a thickness that is sufficient for corrosion protection.

9. The process according to claim 1, wherein a single laser head is used to generate the laser beam having the first beam spot-size and to generate the laser beam having the second beam spot-size.

10. The process according to claim 1, wherein a first laser head is used to generate the laser beam having the first beam spot-size and a second laser head is used to generate the laser beam having the second beam spot-size.

11. The process according to claim 1, comprising subsequent to forming the localized anti-corrosion surface layer, heating the laser welded sheet metal plates to a temperature that is higher than the melting temperature of the anti-corrosion surface layer material, whereby the subsequent heating causes the anti-corrosion surface layer material to melt and redistribute over a larger area.

12. The process according to claim 1, comprising, prior to forming the laser weld joint, removing the anti-corrosion surface layer pre-coat along the adjacent edges of each of the sheet metal plates.

13. The process according to claim 1, wherein the sheet metal plates form one of a part of a multi-piece body side for an automobile, a part of a multi-piece part for an automobile and a part of a door ring for an automobile.

14. A process for joining together metallic parts, comprising:
joining together a first metallic part and a second metallic part at a joining region, at least one of the first metallic part and the second metallic part having an anti-corrosion surface layer pre-coat, and wherein the surface layer pre-coat is disrupted within the joining region during the joining; and
forming a localized anti-corrosion surface layer within a target area that is at least one of within the joining region and adjacent to the joining region, comprising:
scanning a laser beam having a predetermined beam spot-size along a scanning direction through the target area;
tilting the laser beam having the second beam spot-size in a tilt direction to produce an elongated beam spot;
during the scanning, providing a flow of a powdered anti-corrosion surface layer material toward a portion of the target area that is being irradiated by the laser beam,
wherein the powdered anti-corrosion surface layer material is melted by the laser beam and forms a layer adhering to surfaces within the joining region; and
wherein the tilt direction is parallel to the scanning direction.

15. The process according to claim 14, wherein the joining comprises joining using mechanical fasteners.

16. The process according to claim 14, wherein the anti-corrosion surface layer material is zinc or an aluminum-silicon alloy (AlSi).

17. The process according to claim 14, wherein the first and second metallic parts each comprise a steel substrate, and wherein the predetermined beam spot-size is selected to heat the powdered anti-corrosion surface layer material to a temperature that is below the melting temperature of the steel substrate and above 400° C.

18. The process according to claim 14, wherein the target area extends away from the joining region and overlaps with adjacent surface layer pre-coat that is other than disrupted during the joining.

19. The process according to claim 14, wherein the joining disrupts the surface layer pre-coat along a first side of the sheet metal plates and along a second side of the sheet metal plates that is opposite the first side, and wherein the target zone comprises a first target zone along the first side and a second target zone along the second side.

20. The process according to claim 14, comprising:
selecting a flow rate of the powdered anti-corrosion surface layer material for forming a localized anti-corrosion surface layer having a predetermined thickness; and
during the scanning, providing the powdered anti-corrosion surface layer material at the selected flow rate.

21. The process according to claim 14, comprising:
selecting a particle size of the powdered anti-corrosion surface layer material for forming a localized anti-corrosion surface layer having a predetermined thickness; and
during the scanning, providing the powdered anti-corrosion surface layer material having the selected particle size.

22. The process according to claim 14, comprising subsequent to forming the localized anti-corrosion surface layer, heating the joined together metallic parts to a temperature that is higher than the melting temperature of the anti-corrosion surface layer material, whereby the subsequent heating causes the anti-corrosion surface layer material to melt and redistribute over a larger area.

23. The process according to claim 14, wherein the joining comprises laser welding.

24. The process according to claim 23, comprising, prior to laser welding, removing the anti-corrosion surface layer pre-coat along edges of the metallic parts that are to be welded together.

25. The process according to claim 23, wherein the localized anti-corrosion layer extends beyond the edges of the laser weld joint and overlaps with the anti-corrosion surface layer pre-coat on each of the sheet metal plates.

26. The process according to claim 23, wherein the laser weld joint extends between a first side of the sheet metal plates and a second side of the sheet metal plates that is opposite the first side, and wherein the localized anti-corrosion surface layer is formed at least on the laser weld joint along each of the first side and the second side.

27. The process according to claim 23, wherein a single laser head is used to generate the laser beam having the first beam spot-size and to generate the laser beam having the second beam spot-size.

28. The process according to claim 23, wherein a first laser head is used to generate the laser beam having the first beam spot-size and a second laser head is used to generate the laser beam having the second beam spot-size.

29. The process according to claim 23, comprising subsequent to forming the localized anti-corrosion surface layer, heating the laser welded sheet metal plates to a temperature that is higher than the melting temperature of the anti-corrosion surface layer material, whereby the subsequent heating causes the anti-corrosion surface layer material to melt and redistribute over a larger area.

30. The process according to claim 23, comprising, prior to forming the laser weld joint, removing the anti-corrosion surface layer pre-coat along the adjacent edges of each of the sheet metal plates.

31. The process according to claim 23, wherein the sheet metal plates form one of a part of a multi-piece body side for an automobile, a part of a multi-piece part for an automobile and a part of a door ring for an automobile.

* * * * *